United States Patent
Herbert

(10) Patent No.: US 9,844,981 B2
(45) Date of Patent: Dec. 19, 2017

(54) SYSTEMS AND METHODS FOR USE IN A VEHICLE FOR DETECTING EXTERNAL EVENTS

(71) Applicant: Karma Automotive, LLC, Costa Mesa, CA (US)

(72) Inventor: Mark D. Herbert, Baldwin, NY (US)

(73) Assignee: KARMA AUTOMOTIVE LLC, Irvine, CA (US)

(*) Notice: Subject to any disclaimer, the term of this patent is extended or adjusted under 35 U.S.C. 154(b) by 0 days.

(21) Appl. No.: 15/140,337

(22) Filed: Apr. 27, 2016

(65) Prior Publication Data

US 2016/0355125 A1    Dec. 8, 2016

Related U.S. Application Data

(60) Provisional application No. 62/170,066, filed on Jun. 2, 2015.

(51) Int. Cl.
| | |
|---|---|
| *B60Q 5/00* | (2006.01) |
| *B60C 5/00* | (2006.01) |
| *G08G 1/0965* | (2006.01) |
| *G08G 1/16* | (2006.01) |
| *B60K 35/00* | (2006.01) |
| *B60R 22/48* | (2006.01) |

(52) U.S. Cl.
CPC .............. *B60C 5/005* (2013.01); *B60K 35/00* (2013.01); *B60R 22/48* (2013.01); *G08G 1/0965* (2013.01); *G08G 1/166* (2013.01)

(58) Field of Classification Search
CPC ........ B06K 35/00; B60R 22/48; B06Q 5/005; H04R 2499/13
See application file for complete search history.

(56) References Cited

U.S. PATENT DOCUMENTS

| | | | |
|---|---|---|---|
| 2005/0185936 A9* | 8/2005 | Lao .................. | G08B 13/19647 386/210 |
| 2008/0001780 A1* | 1/2008 | Ohno .................. | G08G 1/0962 340/904 |
| 2008/0150755 A1 | 6/2008 | Van Zandt | |
| 2010/0033313 A1 | 2/2010 | Keady | |
| 2012/0071997 A1 | 3/2012 | Aliakseyeu et al. | |
| 2016/0217689 A1* | 7/2016 | Young .................. | G08G 1/0965 |

FOREIGN PATENT DOCUMENTS

WO    WO 2012/097150    7/2012

* cited by examiner

*Primary Examiner* — Curtis Odom
(74) *Attorney, Agent, or Firm* — Farjami & Farjami LLP

(57) ABSTRACT

There is provided a vehicle comprising a microphone positioned to receive sounds originated from outside of the vehicle, an analog-to-digital converter configured to covert the sounds received by the microphone to digital audio signals, a memory storing a sound processing software and one or more known audios, and a hardware processor configured to execute the sound processing software. In one implementation the sound processing software performs comparing the digital audio signals with the one or more known audios stored in the memory, determining, in response to the comparing, a match between the digital audio signals and a first audio of the one or more known audios stored in the memory; and taking an action in response to the determining of the match between the digital audio signals and the first audio.

17 Claims, 7 Drawing Sheets

SYSTEMS AND METHODS FOR USE IN A VEHICLE FOR DETECTING EXTERNAL EVENTS

RELATED APPLICATION(S)

The present application claims the benefit of and priority to U.S. Provisional Patent Application Ser. No. 62/170,066, filed Jun. 2, 2015, which is hereby incorporated by reference in its entirety into the present application.

BACKGROUND

As automotive luxury has been increasing, the isolation of the driver from the outside world has increased due to features, such as noise cancellation and double insulation windows. These features are great for increasing driver comfort and relaxation, but drastically reduce a driver's awareness of events occurring outside of the vehicle.

SUMMARY

The present disclosure is directed to systems and methods for use in a vehicle for detecting external events, substantially as shown in and/or described in connection with at least one of the figures, as set forth more completely in the claims.

DETAILED DESCRIPTION

Figure 1:
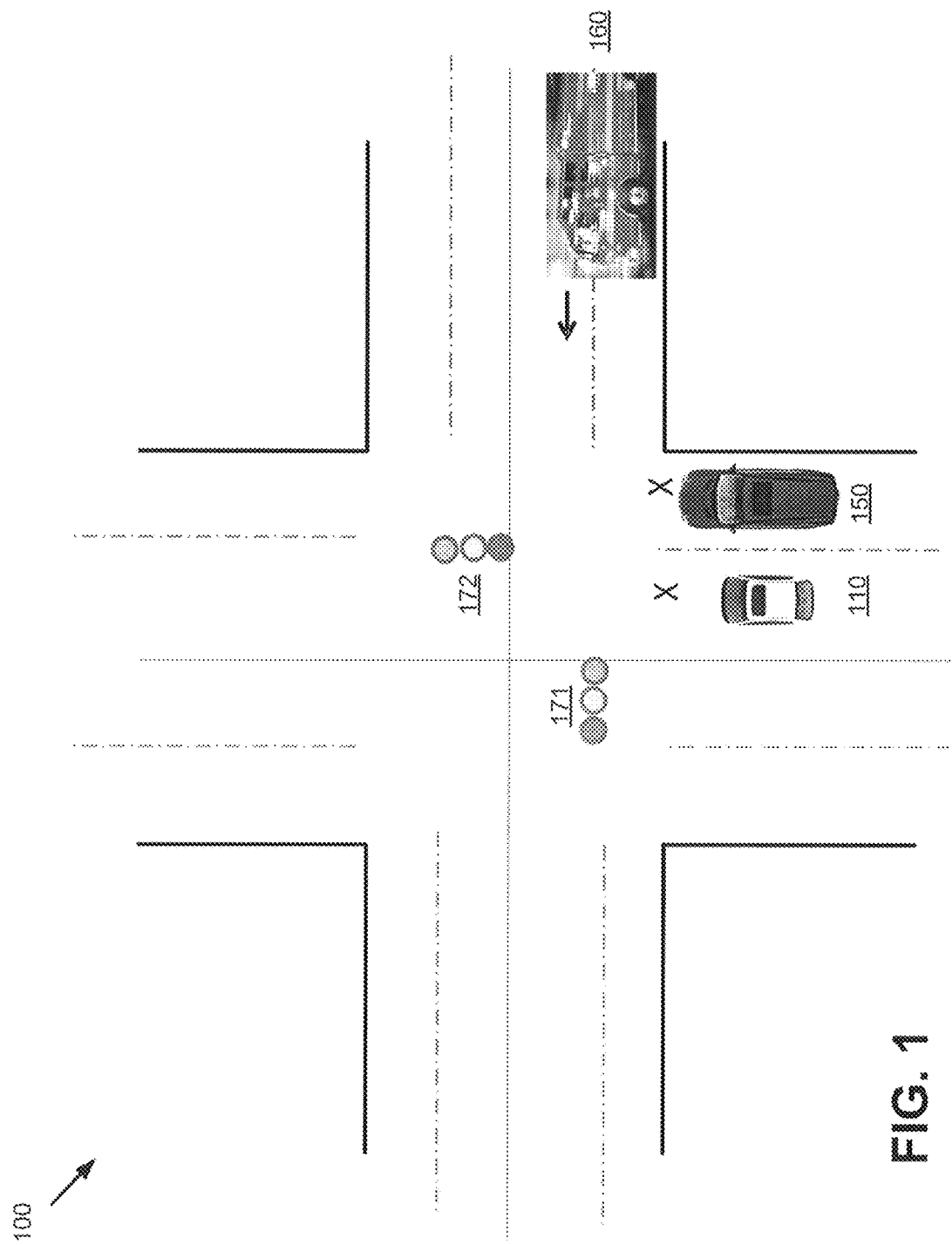
FIG. 1 presents an exemplary diagram of an intersection with two vehicles stopped behind a red traffic light.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents diagram 100 showing an intersection, where vehicle 110 and vehicle 150 have stopped behind a red light at traffic light 172, and also incoming emergency vehicle 160. As shown in FIG. 1, vehicle 150 has obscured the vision of a driver of vehicle 110. For example, vehicle 150 may be a sports utility vehicle (SUV) that substantially blocks the right side view of the driver of vehicle 110. In addition, vehicle 110 may have its windows and sun roof closed, with the music volume up and its air conditioning fan running on high speed. As such, the driver of vehicle 110 would not be able to hear any or much of outside noise. FIG. 1 further depicts emergency vehicle 160 approaching the intersection designated by traffic lights 171 and 172 at a fast speed due to an emergency event, while emergency vehicle 160 has its lights and sirens on.

Figure 2:
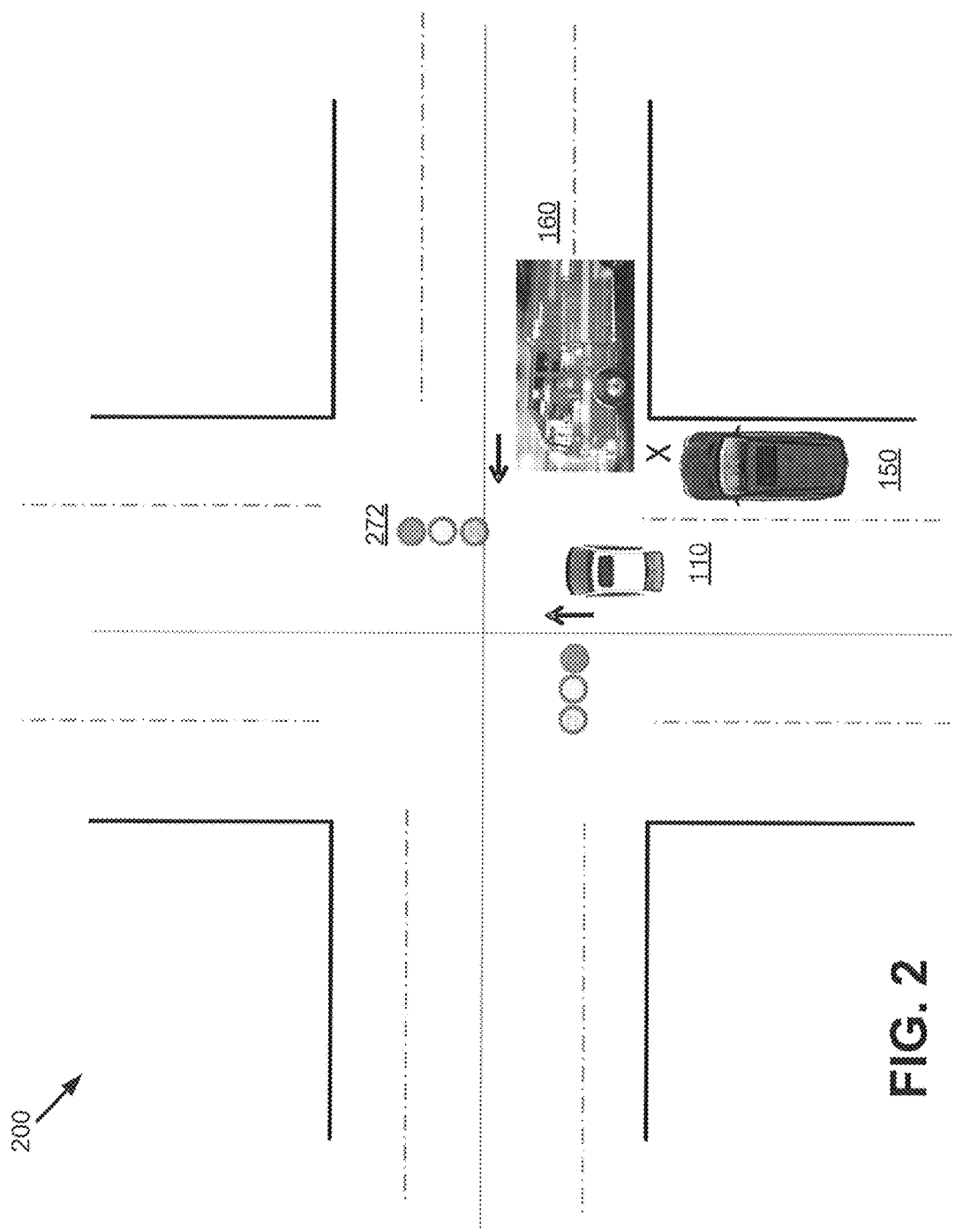
FIG. 2 presents the intersection of FIG. 1 when the traffic light turns green.

FIG. 2 presents diagram 200 showing the intersection of FIG. 1 when traffic light 272, corresponding to traffic light 172 of FIG. 1, turns green. As described above, due to the blocked view of the driver of vehicle 110 and also the outside noise blockage, the driver of vehicle 110 is neither able to see nor hear incoming emergency vehicle 160. As such, when traffic light 272 turns green, the driver of vehicle 110 proceeds to cross the intersection, unaware of incoming emergency vehicle 160, which will result in a collision between vehicle 110 and emergency vehicle 160.

Despite advances in accident avoidance technologies, such as collision mitigation brake system (CMBS) and Blind Spot Detection (BSD), the driver of vehicle 110 would still not be able to avoid the accident described above. For example, by the time emergency vehicle 160 is within the range of the Blind Spot Detector of vehicle 110, the driver of vehicle 110 would have very little chance to avoid the accident.

Figure 3:
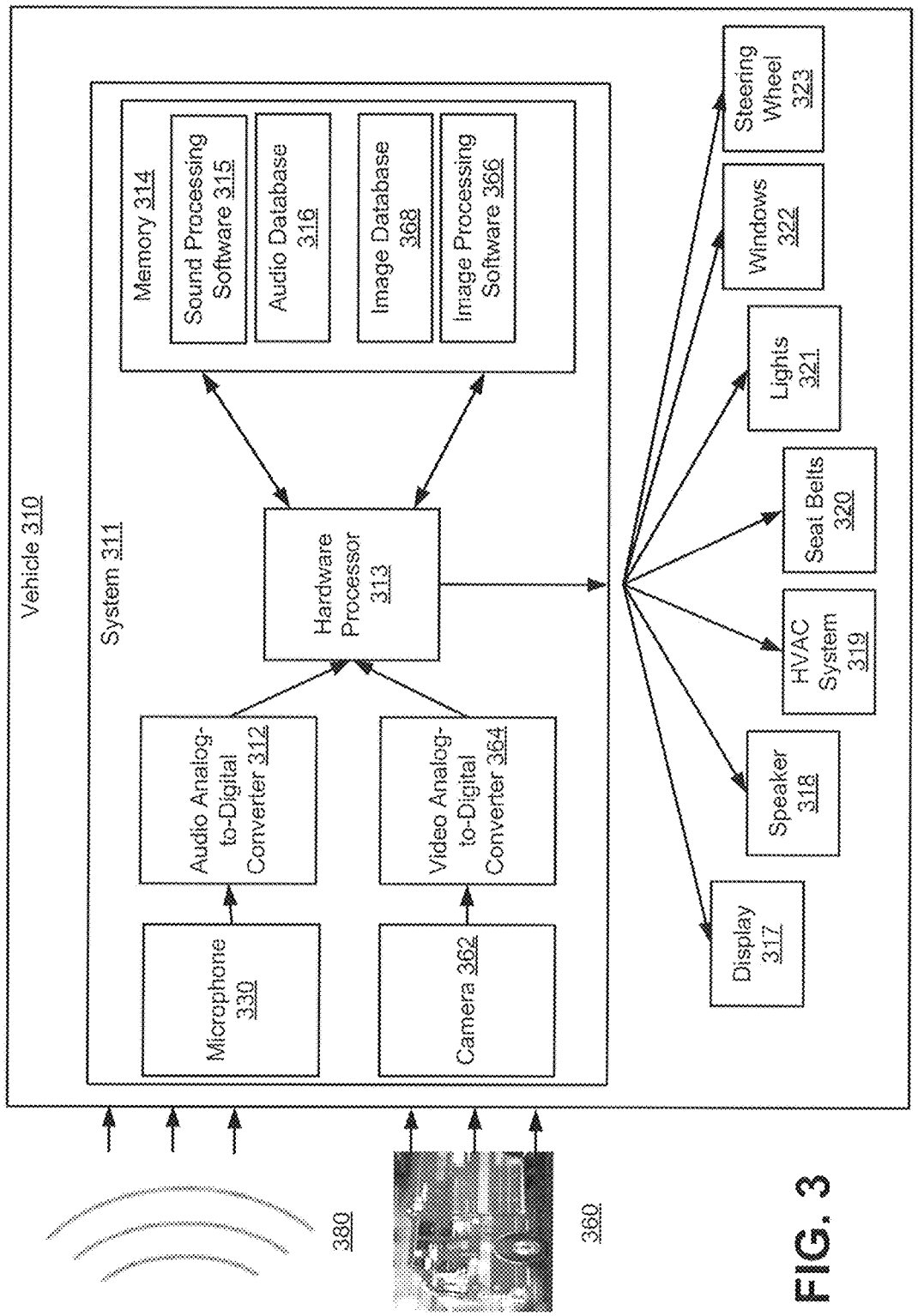
FIG. 3 presents an exemplary vehicle comprising a system for detecting external events and taking one or more actions in response thereto, according to one implementation of the present disclosure.

Turning now to FIG. 3, FIG. 3 presents an exemplary diagram of vehicle 310 comprising system 311 for detecting external events and taking a set of actions in response thereto, according to one implementation of the present disclosure. Vehicle 310 may be any type of vehicle, such as a car, motorcycle, bicycle, boat, etc. System 311 includes microphone 330, camera 362, audio analog-to-digital converter 312, video analog-to-digital converter 364, hardware processor 313, and memory 314. Microphone 330 is an acoustic-to-electric transducer or sensor for receiving sound or audio frequencies 380 and converting audio frequencies 380 to analog audio signals. Camera 362 may be any camera capable of taking still pictures or images, or moving pictures of videos of objects and surroundings external to vehicle 310, such as emergency vehicle 360, people, traffic lights, street signs, store names, buildings, etc. Audio analog-to-digital converter 312 is a software or hardware device for converting analog audio signals generated by audio frequencies 380 to digital audio signals for use by hardware processor 313. Video analog-to-digital converter 364 is a software or hardware device for converting images or videos obtained by camera 362 to digital image signals for use by hardware processor 313.

Hardware processor 313 may be any microprocessor or a similar hardware processor used in a computing device. Hardware processor 313 is able to access memory 314 to store received input or execute commands, processes, or programs stored in memory 314. Memory 314 is a non-transitory hardware storage device capable of storing commands, processes, and programs, such as software applications, for execution by hardware processor 313. As shown in FIG. 3, memory 314 includes audio database 316, which stores various known audios corresponding to, for example, sounds of sirens, car horns, voice commands, etc. Memory 314 also includes sound processing software 315 for execution by hardware processor 313 to compare the digital audio signals, received from audio analog-to-digital converter 312, with the known audios stored in audio database 316 of memory 314. Sound processing software 315 also includes one or more actions that are executed in response to determining a match between the digital audio signals and the known audios based on the comparison.

In one implementation, hardware processor 313 may be configured to receive digital audio signals from audio analog-to-digital converter 312 based on exterior sounds or audio frequencies 380. After receiving the digital audio signals, hardware processor 313 executes sound processing software 315 to compare the digital audio signals with the known audios stored in memory 314 to determine whether a match can be found. In response to determining that audio frequencies 380 correspond to a siren used by an emergency vehicle, for example, hardware processor 313 may execute one or more actions in sound processing software 315 to change settings of a number of devices or components in vehicle 310. These devices or components may include display 317, speaker 318, HVAC fan 319, seat belts 320, lights 321, windows 322, steering wheel 323, etc. In addition, in one implementation, sound processing software 315 may be used by hardware processor 313 to determine a power level of the audio frequencies 380 received by microphone 330, based on which sound processing software 315 may calculate a distance of a source of the sounds from vehicle 310. For example, if the power level of a siren is measured to be 80 dB, display 317 may show that an emergency vehicle is 50 ft away, and if the power level of a siren is measured to be 50 dB, display 317 may show that an emergency vehicle is 100 ft away. In another implementation, hardware processor 313 may execute sound processing software 315 to determine a direction of audio frequencies 380 using multiple microphones, such as microphones 431-437, used as a microphone array, based on which sound processing software 315 may calculate a position of the source of audio frequencies 380. In one implementation, microphone 330 may be used to detect a siren, and camera 362 may be enabled in response to the sound to look for and locate the emergency vehicle and provide its direction of travel and distance from vehicle 310.

In addition to audio database 316 and sound processing software 315, memory 314 also includes image processing software 366 and image database 368. Image database 368 stores various known images corresponding to various objects, including images of emergency vehicles, images of human and animal shapes, traffic lights, street signs, store names, buildings, etc. Memory 314 also includes image processing software 366 for comparing the digital image signals, received from video analog-to-digital converter 364, with the known images stored in image database 368 of memory 314, using various known image processing and detection technologies. Image processing software 366 also includes one or more actions that are executed in response to determining a match between the digital image signals and the known images based on the comparison.

In one implementation, hardware processor 313 may be configured to receive digital image signals from video analog-to-digital converter 364 based on an image of emergency vehicle 360 captured by camera 362. After receiving the digital image signals, hardware processor 313 executes image processing software 366 to process and compare the digital image signals with the known images stored in memory 314 to determine whether a match can be found. In response to determining that the digital image corresponds to an emergency vehicle, hardware processor 313 executes image processing software 366 to change settings of a number of devices or components in vehicle 310. These devices or components may include display 317, speaker 318, HVAC fan 319, seat belts 320, lights 321, windows 322, steering wheel 323, etc. In one implementation, microphone 330 may be used to detect a siren, and camera 362 may be enabled in response to the sound to locate the emergency vehicle and provide its direction of travel and distance from vehicle 310.

Display 317 may be a dashboard or a center display, which may display a speedometer, a fuel gauge, a tachometer, oil pressure gauge, etc. Display 317 may also display messages or warning lights under the control of hardware processor 313. Speaker 318 may be a speaker connected to the vehicle's sound system that can be used for playing audio messages, warnings and music. HVAC fan 319 may any fan used in a vehicle for cooling, heating, or circulating air inside vehicle 310, which may be controlled by hardware processor 313. Seat belts 320 may be a smart seat belt system, which may be controlled by hardware processor 313. For instance, seat belts 320 may tighten or loosened, under the control of hardware processor 313, and in response to detection of an emergency event using microphone 330 and/or camera 362. Lights 321 include a plurality of lights located on the exterior of vehicle 310, including headlights, taillights, and flashers as well as lights located on the interior of vehicle 310, including flashing lights on display 317, etc. Lights 321 may also be controlled by hardware processor 313, in response to detection of an emergency event using microphone 330 and/or camera 362. For example, hardware processor 313 may cause one or more lights 321 to be turned on, in response to detecting an emergency event. Windows 322 may be automatic windows, including sunroofs, with electrical motors in communication with system 311 for automatically opening and closing windows in response to receiving commands from hardware processor 313. Windows 322 may also be controlled by hardware processor 313, in response to detection of an emergency event using microphone 330 and/or camera 362. For example, hardware processor 313 may cause one or more windows 322 to roll down, in response to detecting an emergency event. Steering wheel 323 may also be controlled by hardware processor 313, in response to detection of an emergency event using microphone 330 and/or camera 362. For example, hardware processor 313 may cause steering wheel 323 to vibrate, in response to detecting an emergency event.

In one implementation, system 311 and its warning actions may be selectively enabled and disabled. For example, a driver whose hearing is impaired or is hard of hearing may selectively enable system 311 for monitoring external events, and may also selectively enable one or more of actions using components 317-323 for alerting the driver, in response to hardware processor 313 detecting an external event.

Figure 4:
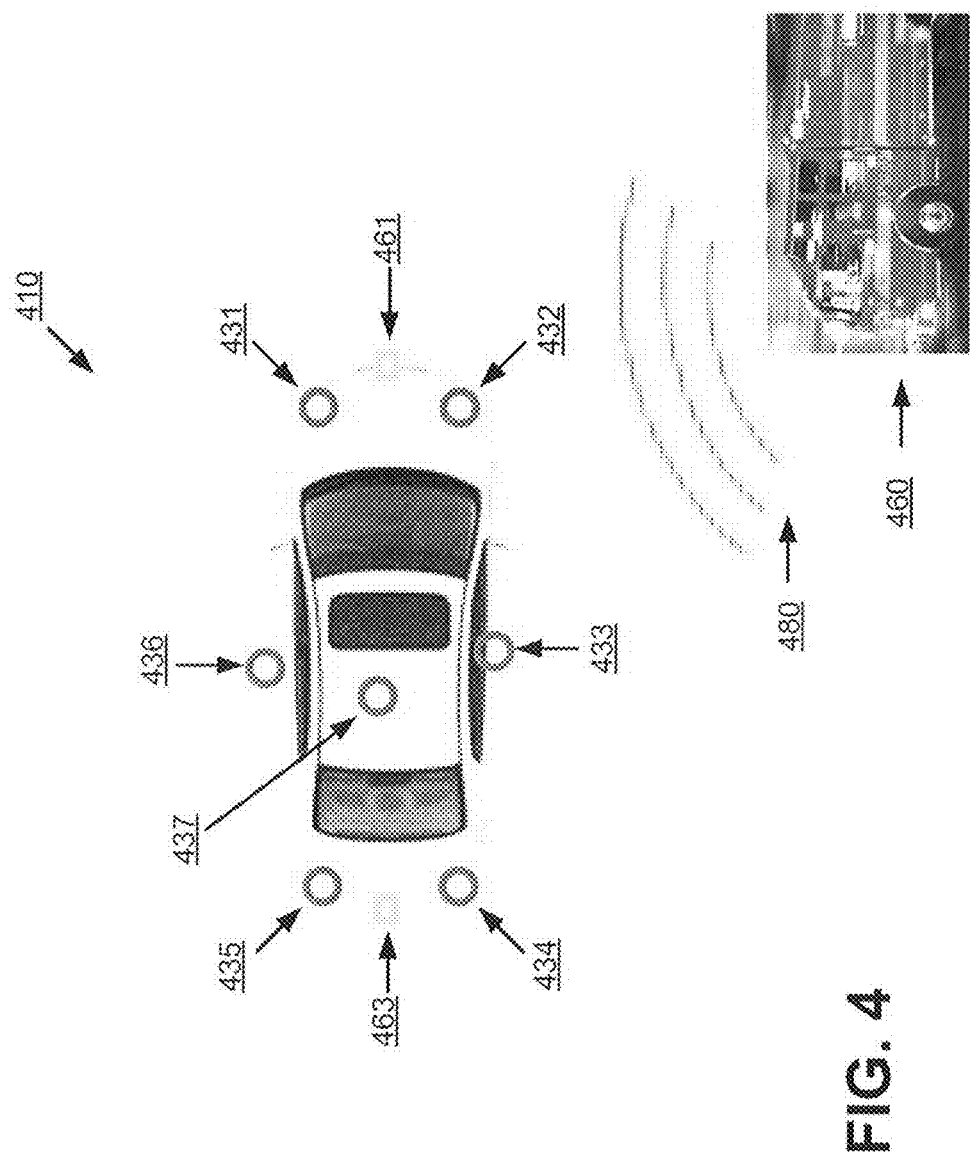
FIG. 4 presents the vehicle of FIG. 3 with a plurality of microphones and/or cameras, according to one implementation of the present disclosure.

FIG. 4 presents vehicle 410 having one or more microphones and/or cameras for receiving sounds and images exterior to vehicle 310, according to one implementation of the present disclosure. For example, as shown in FIG. 4, one or more microphones 431/432/434/435 may be placed in the front and rear bumpers, or any corner of vehicle 410. Further, one or more microphones 433/436 may be placed on each side of vehicle 410. It should be understood by one ordinary skill in the art that the one or more microphones may be strategically placed at various locations of vehicle 410 for detecting sounds exterior to vehicle 410. For example, in one implementation, one or more microphones 431/432/434/435 may be integrated into parking sensors of vehicle 410. In one implementation, microphone 437 may be integrated into a radio antenna of vehicle 410. It should be understood by one with ordinary skill in the art that, in other implementations, microphone 437 may be strategically placed at other locations on the roof of vehicle 410. Microphones 431-437 may be used to detect audio frequencies 480 and emergency vehicle 460, its distance based on power level and its position based on various power levels detected by each of microphones 431-437. For example, as shown in FIG. 4, microphone 432 detects a higher power level for audio frequencies 480 than microphone 432, which indicates the direction of audio frequencies 480.

Vehicle 410 may also be equipped with cameras 461 and 463. Each of cameras is configured to receive still and/or moving images, such as an image of an emergency vehicle, image of a human being, etc. Cameras 461 and 463 may be strategically placed at different location of vehicle 410 to cover a larger area for taking images.

Figure 5:
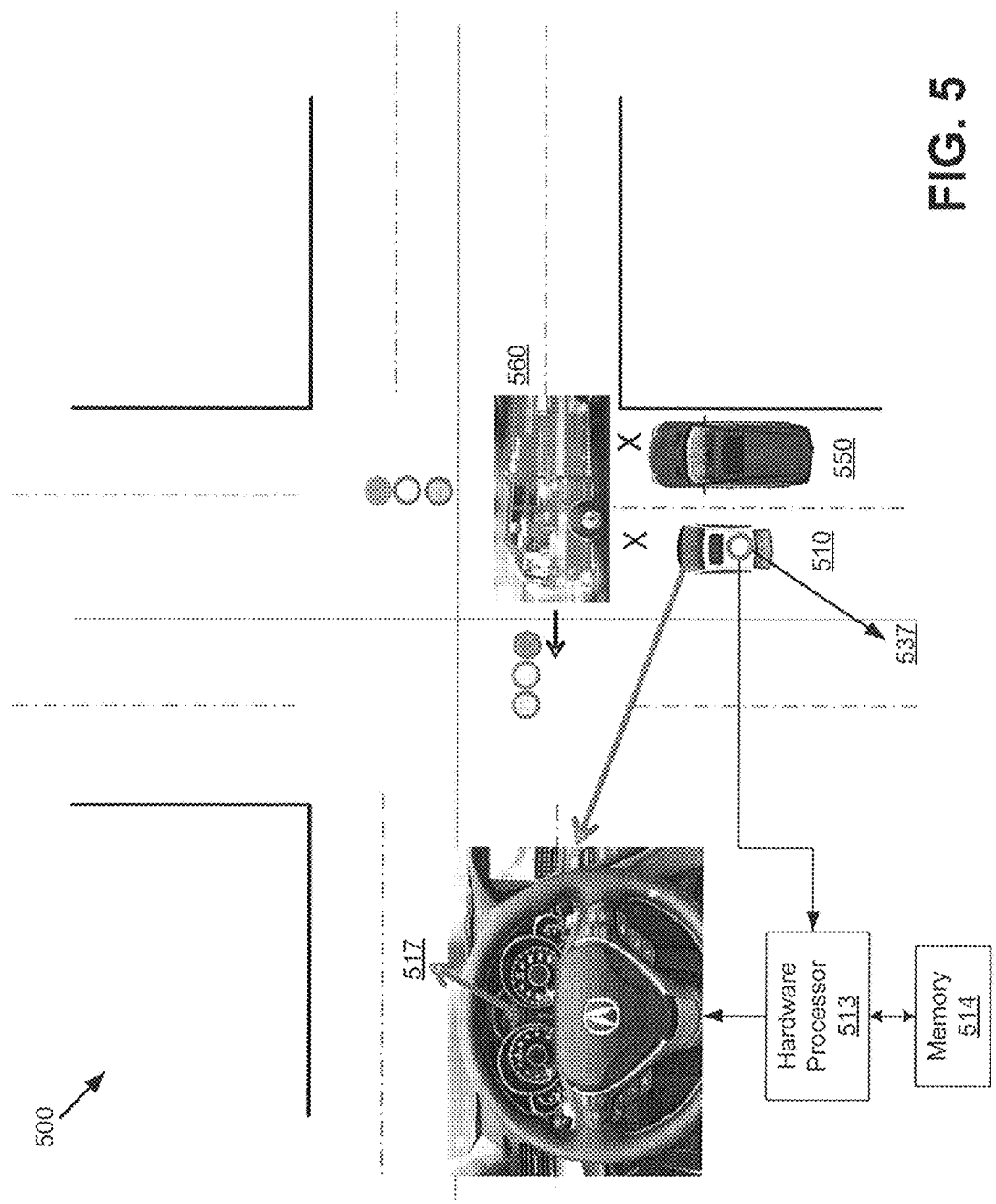
FIG. 5 presents the vehicle of FIG. 3 displaying a message on its display in response to detecting an emergency vehicle, according to one implementation of the present disclosure.

FIG. 5 illustrates diagram 500 showing first vehicle 510, second vehicle 550, and emergency vehicle 560, where first vehicle 510 corresponds to vehicle 310 of FIG. 3, and is equipped with hardware processor 513 connected to microphone 537, display 517 and memory 514 storing known audios. FIG. 5 depicts a situation similar to that of FIG. 1, where first vehicle 510 is blocked by second vehicle 550, and the driver of first vehicle 510 is unable to see or hear incoming emergency vehicle 560.

In the implementation of FIG. 5, microphone 537 of first vehicle 510 receives sounds having one or more audio frequencies, which are converted to digital audio signals by an audio analog-to-digital converter (not shown). In such an implementation, hardware processor 513 may determine that the audio frequencies correspond to siren sounds of an emergency vehicle by comparing the audio frequencies generated by emergency vehicle 560 with one or more known audios stored in memory 514. In response to making this determination, in one implementation, hardware processor 513 of first vehicle 510 may display an "Emergency Vehicle Detected" message on display 517 of first vehicle 510. As a result, the driver of first vehicle 510, unlike the driver of vehicle 110, will be alerted to incoming emergency vehicle 560.

In one implementation of the present disclosure, the audio frequencies received by first vehicle 510 may include voice commands. In such an implementation, the voice commands may be issued by a driver of vehicle 510, who is outside of first vehicle 510. The voice commands can be detected using hardware processor 513 connected to microphone 537, and memory 514 storing one or more known audio commands. For example, a presence or proximity of the driver to vehicle 510 can be detected wirelessly using a smart key carried by the driver. Once the presence or proximity of the smart key is detected, hardware processor 513 may start processing audio signals received from microphone 537. Using speech/voice recognition, hardware processor 513 may recognize audio commands issued by the driver, such as open/close windows, open/close sunroof, unlock/lock doors, unlock trunk, engine on/off, turn on air conditioning, play music, etc.

In one implementation, first vehicle 510, in one implementation, may detect a plurality of smart keys, where each of the plurality of smart keys is associated with a different driver. In response to detecting a particular smart key, vehicle 510 retrieves a profile associated with the particular smart key from the memory. As such, hardware processor 513 recognizes the voice of the driver associated with the particular smart key, and follows voice commands programmed by the driver associated with the particular smart key. If the voice of the person having a smart key does not, however, match the voice stored in the smart key's profile stored in memory 514, hardware processor 513 may not follow the person's voice commands.

Figure 6:
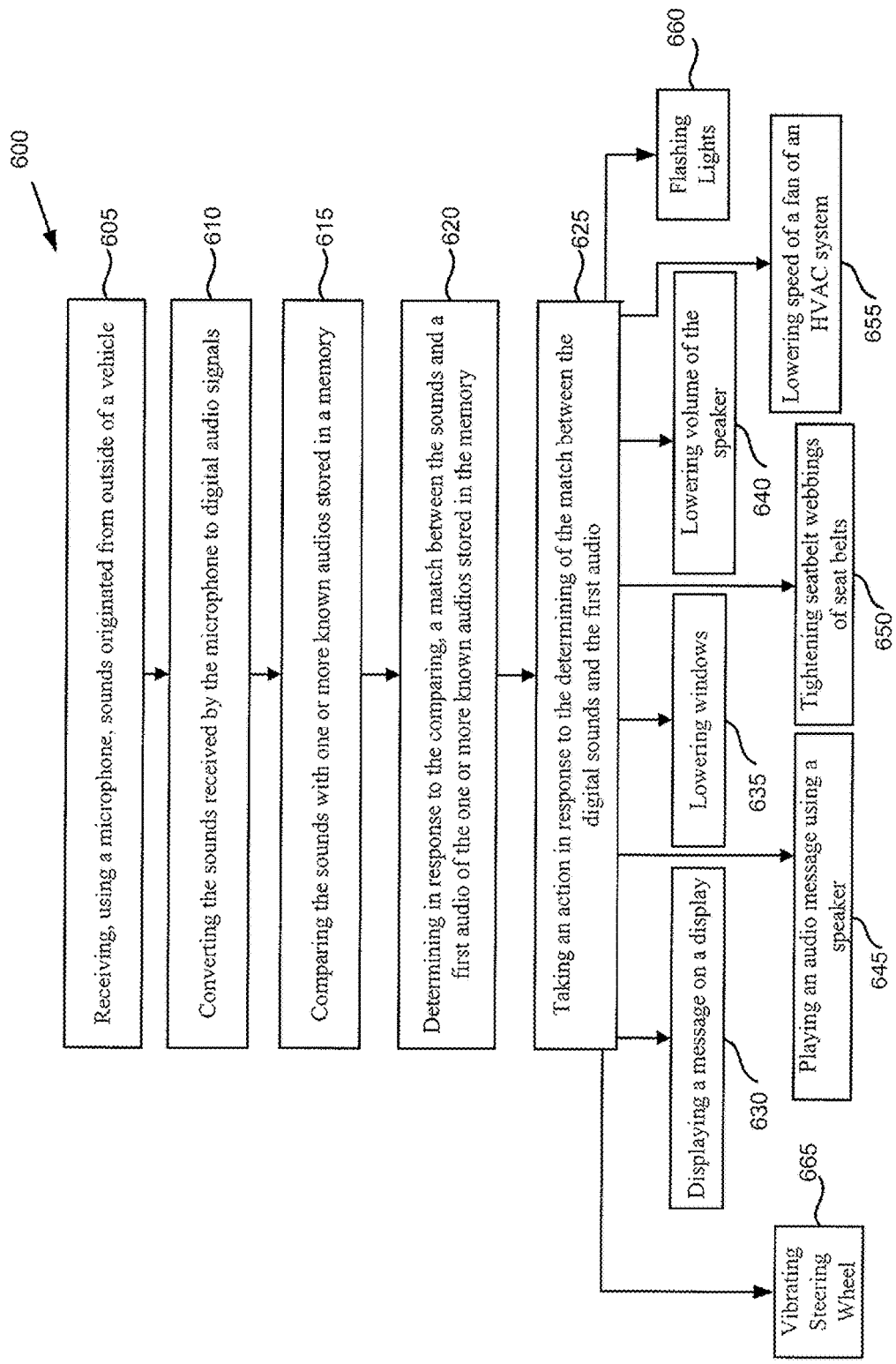
FIG. 6 presents a flow chart of an exemplary method for detecting sounds external to the vehicle and taking one or more actions in response thereto, according to one implementation of the present disclosure.

FIG. 6 presents flowchart 600 illustrating an exemplary method for use by a vehicle for taking one or more actions, in response to receiving and detecting audio sounds originated from outside the vehicle. Flow chart 600 begins, at step 605, with vehicle 310 receiving, using microphone(s) 330, sounds originated from outside of vehicle 310. In one implementation, the sounds may include sounds of sirens originated by emergency vehicles, e.g. police cars or motorcycles, fire trucks, ambulances, etc. In another implementation the sounds may include automobile horns, whether a single horn or repetitive horns, sound of a person screaming or shouting, and sounds of an accident. In yet another implementation, the sounds may include voice commands by a driver of vehicle 310 speaking outside of the vehicle.

At 610, vehicle 310 proceeds by converting the sounds received by microphone 330 to digital audio signals. Audio analog-to-digital converter 312 receives audio frequencies 380 of sounds originated outside the vehicle and converts them to digital audio signals for use by hardware processor 313. At 615, vehicle 310 proceeds by comparing the sounds with one or more known audios stored in memory 314. As described in conjunction with FIG. 3, hardware processor 313 executes sound processing software 315 to compare audio frequencies 380 with known audios, having one or more audio frequencies, stored in audio database 316 of memory 314. The known audios stored in audio database 316 may include various sounds of sirens, car horns, voice commands, sound of a person screaming or shouting, sounds of a loud accident etc. In one implementation, hardware processor 313 may continuously or intermittently search for audio frequencies emitted by emergency vehicles (or any other known audios, such as those mentioned above), using microphone 330. The comparison performed by sound processing software 315 may be a combination of detecting one or more audio frequencies, as well as taking into account duration(s) of certain frequencies and silences therebetween.

At 620, vehicle 310 proceeds by determining, in response to the comparing, a match between the sounds and a first audio of the one or more known audios stored in memory 314. After comparing the sounds with known audios stored in memory 314, sound processing software 315 may determine a match, e.g. sound processing software 315 may determine that audio frequencies 380 match an audio of an emergency vehicle siren. In one implementation, based on the comparing, sound processing software 315 may also determine the type of emergency vehicle, as well. For instance, sound processing software 315 may determine that audio frequencies 380 match audio frequencies of an ambulance's siren by taking into account not only the audio frequencies but duration(s) of certain frequencies and silences therebetween.

In one implementation, in addition to determining that, for instance, audio frequencies 380 match sounds of an ambulance's sirens, sound processing software 315 may also calculate a distance of the ambulance from vehicle 310. Based on the power level of audio frequencies 380 received by microphone 330, sound processing software 315 may calculate that the ambulance is within 200 feet of vehicle 310. In one implementation, based on the distance of the emergency vehicle from vehicle 310, sound processing software 315 may take more actions to alert the driver of vehicle 310.

In another implementation, hardware processor 313 may execute sound processing software 315 to determine a direction of audio frequencies 380 received by microphone 330. Based on the direction from which audio frequencies 480 are being received, sound processing software 315 may then calculate a position of the source of audio frequencies 380. For instance, if one or more microphones attached to the rear of vehicle 310 receive audio frequencies with a higher power level than microphones attached to other parts of vehicle 310, sound processing software 315 may then determine that the audio frequencies are being generated by a police car from behind, which is attempting to pull vehicle 310 over.

In yet another implementation, sound processing software 315 may determine more than one match between audio frequencies 380 and the known audios stored in memory 314. For instance, sound processing software 315 may detect sounds of two different sirens, one originating from a fire truck and the other from a police car. In such an implementation, sound processing software 315 may determine both the distance between each of the emergency vehicles and vehicle 310 and also the emergency vehicles' positions. For instance, if the fire truck is coming towards vehicle 310 and is closer, sound processing software 315 may first alert the driver regarding the fire truck and subsequently alert the driver of the police car, which is farther away from vehicle 310.

At 625, vehicle 310 proceeds with taking an action in response to determining a match between the sounds and a first audio. Once sound processing software 315 determines that, for instance, an emergency vehicle is in the vicinity of vehicle 310, hardware processor 313 proceeds to execute sound processing software 315 to alter settings of one or more devices or components within vehicle 310. For instance, vehicle 310 may be traveling towards an intersection while speaker 318 is playing music with a high volume, HVAC system 319 is circulating air with a high fan speed, seat belts 320 in their normal state, and windows 320 all closed. After detecting an emergency vehicle close by, hardware processor 313 may perform one or more of actions 630-665. Actions 630-665, respectively, include displaying a message, such as "Fire Truck Approaching from North East, 200 ft. Away" on display 317 at 630, lowering windows 323 at 635, lowering or muting the volume of speaker 318 at 640, playing an audio message, such as "Caution . . . Police Car Approaching from Behind" using speaker 318 at 645, tightening seatbelt webbings of seat belts 321 at 650, lowering the speed of the fan of HVAC system 319 at 655, flashing lights 321 on display 317 or turning on the flashers on the exterior of vehicle 310 at 660, and vibrating steering wheel 323 at 665. These actions or changes in the settings of various devices and components of vehicle 310 may take place in any order.

In addition, sound processing software 315 may react to different levels of emergency in different ways. For instance, if an ambulance is 1,000 feet away, sound processing software 315 may not even alert the driver of an emergency situation. On the other hand, if the ambulance is within 200 feet of vehicle 310 and is traveling towards vehicle 310, sound processing software 315 may take all or some of the actions listed above. Whether one or more of these actions are taken depends on an emergency situation grade that may be assigned to the situation by sound processing software 315. As a result, the grade assigned to the emergency situation may be a function of the distance of the emergency vehicle from vehicle 310 and the position of the emergency vehicle.

After sounds of sirens, or other audio frequencies, requiring a response by sound processing software 315 are no longer detected or it is determined by sound processing software 315 that alerting the driver is not necessary, hardware processor 313 may revert one or all of the changed settings back to their status prior to the change. For instance, after no sounds of sirens are detected, or it is determined that the ambulance is getting farther away from vehicle 310, hardware processor 313 may turn-up the volume of speaker 318, turn-up the fan speed for HVAC system 318, or loosen the seatbelt webbings of seat belts 310 etc. In one implementation, however, hardware processor 313 may maintain the changed settings of one or more devices or components even for sometime after an emergency is no longer detected, or the emergency situation is determined to be less dangerous.

In the implementation where audio frequencies 380 include voice commands of the driver of vehicle 310, the actions vehicle 310 may take in response to detecting the voice of the driver may include open/close windows, open/close sunroof, unlock/lock doors, unlock trunk, engine on/off, turn on air conditioning, play music, etc. In such an implementation, these voice commands may be stored in memory 314 beforehand, using microphones inside the car to record the driver's voice. As described in conjunction with FIG. 5, the presence or proximity of the driver to vehicle 310 can be detected wirelessly using a smart key carried by the driver. To assure detection, the smart key may need to be within a specific range of vehicle 310. Once the presence or proximity of the smart key is detected, hardware processor 313 may start searching for voice commands and subsequently process any audio signals received from microphone 330.

Figure 7:
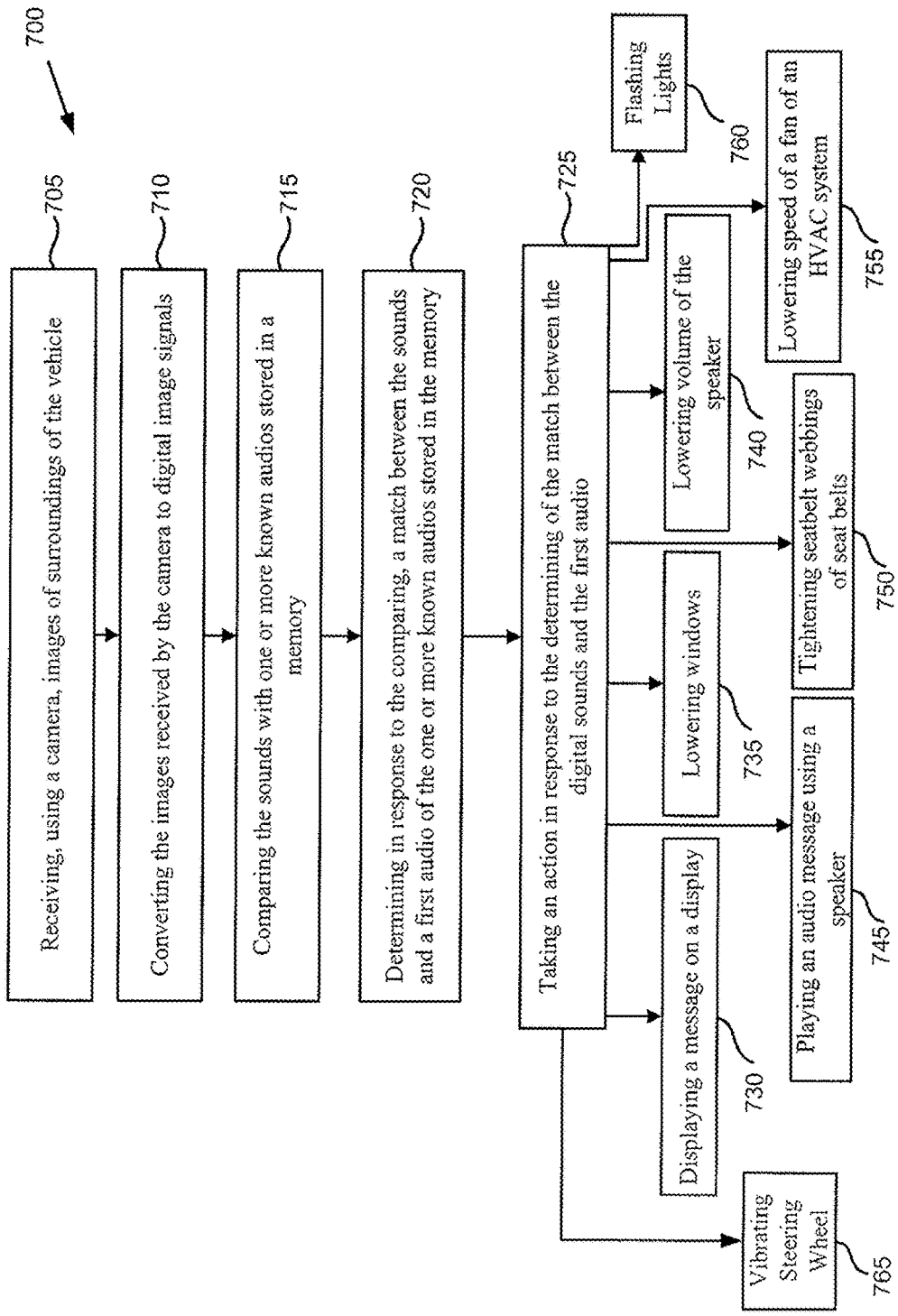
FIG. 7 presents a flow chart of an exemplary method for detecting images external to the vehicle and taking one or more actions in response thereto, according to one implementation of the present disclosure.

FIG. 7 presents flowchart 700 illustrating a method for use by a vehicle for taking one or more actions in response to receiving and detecting images of events outside the vehicle. Flow chart 700 begins, at step 705, with vehicle 310 capturing images of objects located outside of vehicle 310, using camera(s) 360. In one implementation, the images may include images of emergency vehicles, e.g. police cars or motorcycles, fire trucks, ambulances etc. In another implementation, the images may include images of humans and animals. As described in conjunction with FIG. 3, camera 362 may be a camera used for electronic acquisition of images of scenes around vehicle 310.

At 710, vehicle 310 proceeds by converting the images received by camera 362 to digital image signals. Video analog-to-digital converter 364 captures an image of an object outside vehicle 310, such as an image of emergency vehicle 360, and converts the captured image to digital image signals for use by hardware processor 313. At 715, vehicle 310 proceeds by comparing the digital image signals with one or more known images stored in image database 368 of memory 314. As described in conjunction with FIG. 3, hardware processor 313 executes image processing software 366 to compare an image of emergency vehicle 360 with known images stored in image database 366 of memory 314. The known images stored in image database 366 may include images of emergency vehicles, as well as people, traffic lights, street signs, store names, buildings, etc. In one implementation, hardware processor 313 may continuously or intermittently capture images using camera 362.

At 720, vehicle 310 proceeds by determining, in response to the comparing, a match between an image of emergency vehicle 360 and a first image of the one or more known images stored in memory 314. After comparing the image of emergency vehicle 360 with known images stored in memory 314, image processing software 366 may determine a match between image of emergency vehicle 360 and an image of an emergency vehicle in image database 366. In one implementation, using known image detection technologies, image processing software 366 may also determine the type of emergency vehicle as well. For instance, image processing software 366 may determine that the image captured by camera 362 matches the image of an ambulance.

In one implementation, in addition to determining the type of the emergency vehicle, image processing software 366 may also calculate a distance of the ambulance from vehicle 310. Based on how large or small the dimensions of the ambulance are in image 360, image processing software 366 may determine that the ambulance is close or far, respectively. In another implementation, hardware processor 313 may execute image processing software 366 to calculate a position of the ambulance relative to vehicle 310. For instance, in one implementation, if a camera attached to the right side of vehicle 310 captures images of the ambulance while a camera attached to the left side of vehicle 310 does not, image processing software 366 may determine that the ambulance is approaching from the right side of vehicle 310. Furthermore, image processing software 366 may capture a series of images of the ambulance, and by comparing the distance and position of the ambulance in each image with the distance and position of the ambulance in previous image(s), image processing software 366 may determine the direction of travel for the ambulance.

In yet another implementation, image processing software 366 may determine more than one match between an image captured by camera 362 and the known images stored in memory 314. For instance, image processing software 366 may detect an ambulance and a fire truck to be both present in a captured image. In such an implementation, image processing software 366 may determine both the distance between each of the emergency vehicles and vehicle 310, and also the emergency vehicles' positions. Accordingly, image processing software 366 may first alert the driver of vehicle 310 of the more imminent danger. For instance, if the fire truck is travelling towards vehicle 310 and is closer, image processing software 366 may first alert the driver regarding the fire truck, and subsequently alert the driver of the police car, which is farther away from vehicle 310.

At 725, vehicle 310 proceeds with taking one or more actions in response to determining a match between the image of emergency vehicle 360 and a first known image stored in memory 314. Once image processing software 366 determines that, for instance, an emergency vehicle is in the vicinity of vehicle 310, hardware processor 313 proceeds to execute image processing software 366 to take one or more actions by altering settings of one or more devices or components within vehicle 310. For instance, in one implementation, vehicle 310 may be traveling towards an intersection while speaker 318 is playing music with a high volume, HVAC system 319 is circulating air with a high fan speed, seat belts 320 in their normal state, and windows 320 all closed.

After detecting an emergency vehicle close by, hardware processor 313 may alert the driver of the emergency vehicle by performing one or more of actions 730-765. Actions 730-765, respectively, include displaying a message, such as "Fire Truck Approaching from North East, 200 ft. Away" on display 317 at 730, lowering or muting the volume of speaker 318 at 735, playing an audio message, such as "Caution . . . Police Car Approaching from Behind" using speaker 318 at 740, lowering windows 323 at 745, tightening seatbelt webbings of seat belts 321 at 750, lowering the speed of the fan of HVAC system 319 at 755, flashing lights 321 on display 317 or turning on the flashers on the exterior of vehicle 310 at 760, and vibrating steering wheel 323 at 765. These actions or changes in the settings of various devices and components of vehicle 310 may take place in any order.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A vehicle comprising:
 a microphone positioned to receive sounds originated from outside of the vehicle;
 a camera positioned to receive images originated from outside of the vehicle;
 a first analog-to-digital converter configured to covert the sounds received by the microphone to digital audio signals;
 a second analog-to-digital converter configured to convert the images received by the camera to digital image signals;
 a memory storing a sound processing software, known audios, an image processing software, and known images; and
 a hardware processor configured to execute the sound processing software and the image processing software to perform:
  comparing the digital audio signals and the digital image signals with the known audios and the known images, respectively;
  determining, in response to the comparing, a match of at least one of the digital audio signals and the digital image signals with a first audio of the known audios and a first image of the known images, respectively; and
  taking an action in response to the determining of the match;
 wherein the hardware processor is further configured to enable the camera to receive the images in response to determining the match between one of the digital audio signals and the known audios.

2. The vehicle of claim 1 further comprising a display and a speaker, wherein the taking of the action includes at least one of displaying a message on the display and playing an audio using the speaker.

3. The vehicle of claim 1 further comprising a seatbelt, wherein the taking of the action includes tightening the seatbelt.

4. The vehicle of claim 1, wherein the hardware processor is further configured to execute the sound processing software to perform:
 determining a power level of the sounds; and
 calculating, based on the power level, a distance of a source of the sounds from the vehicle.

5. The vehicle of claim 1, wherein the hardware processor is further configured to execute the sound processing software to perform:
- determining a direction of the sounds; and
- calculating, based on the direction, a position of a source of the sounds in relation to the vehicle.

6. The vehicle of claim 1, wherein the sounds include siren sounds generated by an emergency vehicle.

7. A method for use by a vehicle including a memory storing known audios and known images, the method comprising:
- receiving, using a microphone, sounds originated from outside of the vehicle;
- receiving, using a camera, images originated from outside of the vehicle;
- comparing, using a hardware processor, the sounds and the images with the known audios and the known images, respectively;
- determining, using the hardware processor, in response to the comparing, a match of at least one of the sounds and the images with a first audio of the known audios and a first image of the known images, respectively; and
- taking an action, using the hardware processor, in response to the determining of the match;
- wherein the hardware processor enables the camera to receive the images in response to determining the match between one of the sounds and the known audios.

8. The method of claim 7, wherein the vehicle further includes a display and a speaker, and wherein the taking of the action includes at least one of displaying a message on the display and playing an audio using the speaker.

9. The method of claim 7, wherein the vehicle further includes a seatbelt, and wherein the taking of the action includes tightening the seatbelt.

10. The method of claim 7 further comprising:
- determining a power level of the sounds; and
- calculating, based on the power level, a distance of a source of the sounds from the vehicle.

11. The method of claim 7 further comprising:
- determining a direction of the sounds; and
- calculating, based on the direction, a position of a source of the sounds in relation to the vehicle.

12. The method of claim 7, wherein the sounds include siren sounds generated by an emergency vehicle.

13. A vehicle comprising:
- a microphone positioned to receive sounds originated from outside of the vehicle;
- a camera positioned to receive images originated from outside of the vehicle;
- a memory storing a sound processing software, known audios, an image processing software, and known images; and
- a hardware processor configured to execute the sound processing software and the image processing software to perform:
  - comparing the sounds and the images with the known audios and the known images, respectively;
  - determining, in response to the comparing, a match of at least one of the sounds and the images with at least one of a first audio of the known audios and a first image of the known images, respectively; and
  - taking an action in response to the determining of the match:
- wherein the hardware processor is further configured to enable the camera to receive the images in response to determining the match between one of the sounds and the known audios.

14. The vehicle of claim 13 further comprising a display and a speaker, wherein the taking of the action includes at least one of displaying a message on the display and playing an audio using the speaker.

15. The vehicle of claim 13 further comprising a seatbelt, wherein the taking of the action includes tightening the seatbelt.

16. The vehicle of claim 13, wherein the hardware processor is further configured to execute the sound processing software to perform:
- determining a power level of the sounds; and
- calculating, based on the power level, a distance of a source of the sounds from the vehicle.

17. The vehicle of claim 13, wherein the hardware processor is further configured to execute the sound processing software to perform:
- determining a direction of the sounds; and
- calculating, based on the direction, a position of a source of the sounds in relation to the vehicle.

* * * * *